United States Patent
Bobrowski

(10) Patent No.: US 6,533,653 B1
(45) Date of Patent: Mar. 18, 2003

(54) MEAT TENDERIZER WITH FORCE LIMITING APPARATUS AND ORTHOGONAL BLADE SET

(76) Inventor: ClaMounte R. Bobrowski, 3307 Horseman La., Falls Church, VA (US) 22042

( * ) Notice: Subject to any disclaimer, the term of this patent is extended or adjusted under 35 U.S.C. 154(b) by 0 days.

(21) Appl. No.: 09/955,097

(22) Filed: Sep. 19, 2001

(51) Int. Cl.⁷ .................................................. A22C 9/00
(52) U.S. Cl. ...................................................... 452/141
(58) Field of Search ............................... 452/141, 144, 452/146

(56) References Cited

U.S. PATENT DOCUMENTS

| | | | |
|---|---|---|---|
| 863,717 A | 8/1907 | Jamison | |
| 1,570,792 A | 1/1926 | Spang | |
| 1,965,462 A | 7/1934 | Irwin | |
| 2,083,848 A | 6/1937 | La Berge | |
| 2,128,872 A | 8/1938 | Zahn | |
| 2,159,730 A | 5/1939 | Voris | |
| 3,535,734 A | * 10/1970 | Ross | 452/141 |
| 3,736,623 A | * 6/1973 | O'Malley et al. | 452/141 |
| 3,772,737 A | 11/1973 | Fleiss | |
| 3,842,464 A | * 10/1974 | McCord | 452/141 |
| 3,991,439 A | * 11/1976 | Wagner | 452/141 |
| 4,027,356 A | * 6/1977 | Wagner et al. | 452/141 |
| 4,169,300 A | 10/1979 | McCullough | |
| 4,186,462 A | * 2/1980 | Bettcher | 452/141 |
| 4,205,414 A | * 6/1980 | Ueno et al. | 452/141 |
| 4,216,566 A | * 8/1980 | Bettcher | 452/141 |
| 4,287,642 A | * 9/1981 | Jaccard et al. | 453/141 |
| 4,338,701 A | * 7/1982 | d'Arras | 452/141 |
| 4,437,207 A | 3/1984 | Ross | |
| 5,342,235 A | * 8/1994 | Watanabe | 452/141 |
| 5,383,814 A | 1/1995 | Jaccard | |
| 5,826,628 A | 10/1998 | Hamilton | |
| 6,120,368 A | 9/2000 | Ter-Minasssian | |

FOREIGN PATENT DOCUMENTS

| | | | | |
|---|---|---|---|---|
| DE | 26 45 337 A 1 | * | 4/1997 | 452/141 |

OTHER PUBLICATIONS

Anatech Ltd., "Casidiam™ Diamond–like hard carbon process", Characteristics of Casidiam™, and Press Release dated Feb. 17, 2000.

* cited by examiner

*Primary Examiner*—Peter M. Poon
*Assistant Examiner*—Joan M. Olszewski
(74) *Attorney, Agent, or Firm*—Griffin & Szipl, P.C.

(57) ABSTRACT

A mechanical meat tenderizer having the features of a force-limiting apparatus and an orthogonal blade set. The tenderizer comprises a set of orthogonal knife cutting blades and a reciprocable head for releasably holding individual knife cutting blades for insertion into meat to be tenderized. The reciprocable head comprises a meat securing member such as a hold-down plate, a blade orienting member such as an orientation plate for orienting the knives, and a friction plate for providing a predetermined frictional release force for independently positioning and holding the set of orthogonal blades so that when any one of the orthogonal blades encounters a release force exceeding the predetermined release force the blade is released and not damaged. The orthogonal blade set preferably includes straight blades and orthogonal blades, each having a spring or frictional member for frictionally engaging a respective portion of a friction bar.

18 Claims, 5 Drawing Sheets

MEAT TENDERIZER WITH FORCE LIMITING APPARATUS AND ORTHOGONAL BLADE SET

FIELD OF THE INVENTION

This invention relates to meat tenderizers with a force-limited apparatus for tenderizing meat. More particularly, the invention relates to a meat tenderizer with a non-magnetic force-limited apparatus for tenderizing meat that utilizes a series of coated bars and a set of orthogonal blades, which is an improvement over known apparatuses.

BACKGROUND OF THE INVENTION

In the art of mechanically tenderizing meat, it is known that to tenderize a piece of tough meat a meat tenderizing apparatus typically stabs or cuts the meat with a plurality of sharp blades as is shown in U.S. Pat. No. 4,169,300 to McCullough, and herein incorporated by reference. In addition, McCullough teaches that to protect the blades from damage when encountering bone in the meat a mechanism of springs and ball bearings can be used to allow any blade to be released if bone or other hard matter is encountered. However, McCullough's device requires numerous small parts and is difficult and expensive to assemble and maintain.

In U.S. Pat. No. 4,437,207 to Ross, a plurality of cobalt-sumarian alloy magnets that magnetically couple with blade "poles" made from special silicon iron alloys are used. Ross thus provides an alternate mechanism for achieving the same result; that is, to allow any blade to be released when bone or other hard matter is encountered by the blades. However, the magnets disclosed by Ross are expensive and many are needed to make the device. Furthermore, the magnetic mechanism is not durable because the "poles" attached to the blades and made of the special silicon iron alloy corrode and fail to effectively couple with the magnets. In addition, meat tenderizing blades often wear out or are damaged under normal operating conditions and need to be replaced. It is expensive to replace the blades required by the Ross patent because of the pole made of a costly alloy.

However, the present inventor has found that the most cost efficient mechanical meat tenderizer is disclosed in U.S. Pat. No. 6,120,368 to Ter-Minassian, the entire disclosure of which is incorporated herein by reference. The meat tenderizer disclosed by Ter-Minassian has a force limited apparatus for protecting the blades comprising a friction plate manufactured with a plurality of square holes for frictionally engaging a plurality of meat cutting blades. Each square hole frictionally engages one blade, and each blade is made with a frictional portion for engaging two opposing walls of a corresponding square hole. The frictional portion of each blade is a spring formed as part of the blade.

The Ter-Minassian meat tenderizer has the advantages that it is practical and cost effective to manufacture, durable, easy to clean and easy to maintain; however, the device has several problems. First, to make the square holes in the friction plate, it is most cost efficient to use a punch. Other technologies can be used, such as lasers or high velocity water drills, but these methods are expensive. The drawback of using a punch to make the square holes is that the holes are less uniform. Small variations in the geometry of the hole on the order of a thousandth of an inch can have dramatic consequences. Specifically, it has been found that the ideal release force on each blade is about 4 pounds. At this force, each blade can perform its cutting function optimally with minimal risk of damage to the blade. When the Ter-Minassian friction plate is made using a punch to form the square holes, the force required to frictionally disengage the springs of the blades from the square holes averages about 4 pounds, but the variance is +/−2 pounds. Consequently, some of the blades are prone to damage when not released at 4 pounds of force and other blades are released prematurely and fail to perform an adequate cut.

In addition, once a blade has been released by the force-limiting apparatus, a plate is used to reset all of the released blades back into each respective square hole before further cuts can be made into the meat to be tenderized. To perform its optimal tenderizing function, each Ter-Minassian meat tenderizer utilizes hundreds of blades; therefore, over a thousand pounds of force may been needed to reset the blades. This great amount of force required for reset is another drawback of the Ter-Minassian meat tenderizer.

The present invention endeavors to provide an improved mechanical meat tenderizer with a force limited apparatus for protecting the blades that maintains the advantages of the Ter-Minassian device while overcoming the drawbacks of the prior art machines.

Accordingly, a primary object of the present invention is to overcome the disadvantages of the prior art mechanical meat tenderizers.

Another object of the present invention is to provide a mechanical meat tenderizer with an improved force limiting apparatus that is practical and cost effective to manufacture.

Another object of the present invention is to provide a mechanical meat tenderizer that is both durable and reliable.

Another object of the present invention is to provide a mechanical meat tenderizer that is both easy to clean and easy to maintain.

Another object of the invention is to provide a mechanical meat tenderizer that achieves a substantially uniform release force for every blade of a plurality of blades.

Another object of the invention is to provide a mechanical meat tenderizer that has a plurality of blades that reset by applying a minimal force.

Another object of the invention is to provide a mechanical meat tenderizer that functions using blades that are easy and inexpensive to replace.

SUMMARY OF THE INVENTION

In accordance with the above objectives, the present invention provides an apparatus for mechanically tenderizing meat comprising (1) a plurality of elongated cutting blades having cutting edges formed on one end thereof, a frictional member proximate another end thereof, and a longitudinal axis; and (2) a reciprocatable head holding the plurality of cutting blades and movable from a first position wherein the plurality of blades is retracted to a second position wherein the plurality of blades is extended. The reciprocatable head comprises (a) a meat securing member, (b) a friction plate, and (c) a blade orienting member disposed to orient the blades in spaced relationship so that the longitudinal axis of each blade is aligned substantially parallel to the longitudinal axis of each other blade. The friction plate further comprises a plurality of friction bars disposed to frictionally engage the friction members of the blades, wherein each bar of the plurality of bars frictionally engages the frictional member of each blade of a respective set of the blades so that a predetermined force is provided for independently holding each of the blades in a fixed position with respect to the friction plate as the blades move to the second position.

The desired objectives are also achieved by one embodiment of the mechanical meat tenderizer of the present invention by employing an improved force-limiting apparatus and sets of orthogonal blades. The force limiting apparatus comprises a friction plate comprising a frame plate having an upper face and a lower face, with a plurality of longitudinal grooves formed on the lower face wherein the plurality of longitudinal grooves comprise two lateral grooves and at least one center groove so that a longitudinal ridge is disposed between every two longitudinal grooves; and, a plurality of blade holes formed in the frame plate wherein each blade hole opens onto the upper face and the lower face and is centered on a corresponding longitudinal ridge so that each blade hole is bordered by at least one island formed from a portion of the corresponding longitudinal ridge, and so that each blade hole has a portion formed in two adjacent grooves of the plurality of longitudinal grooves. Furthermore, the friction plate comprises a plurality of bars disposed respectively in the plurality of longitudinal grooves, wherein each bar encroaches upon and narrows a corresponding number of respective blade holes so that two adjacent bars provide corresponding two square faces for frictionally engaging a spring of a cutting blade that is disposed within a corresponding blade hole.

In a preferred embodiment, each bar is coated with a hard, low friction finish, such as CASIDIAM™.

In another preferred embodiment, the friction plate further comprises a face plate comprising a outer face and an inner face, and a plurality of holes formed in the face plate, wherein each hole opens on the outer face and the inner face and so that each hole corresponds to a respective blade hole of the frame plate.

In another preferred embodiment, the set of orthogonal blades comprises a plurality of orthogonal blade pairs disposed in the plurality of blade holes, wherein each orthogonal blade pair includes a first blade and an orthogonal second blade, wherein each first blade is disposed on the frame plate to be adjacent to a corresponding orthogonal second blade.

In yet another embodiment, the present invention provides a method for tenderizing meat. The method comprises the step of (1) providing an apparatus comprising: (a) a plurality of elongated cutting blades having cutting edges formed on one end thereof, a frictional member proximate another end thereof, and a longitudinal axis; and (b) a reciprocatable head holding the plurality of cutting blades and movable from a first position wherein the plurality of blades is retracted to a second position wherein the plurality of blades is extended. The reciprocatable head comprises (i) a meat securing member, (ii) a friction plate, and (iii) a blade orienting member disposed to orient the blades in spaced relationship so that the longitudinal axis of each blade is aligned substantially parallel to the longitudinal axis of each other blade. The friction plate comprises a plurality of friction bars disposed to frictionally engage the friction members of the blades, wherein each bar of the plurality of bars frictionally engages the frictional member of each blade of a respective set of the blades so that a predetermined force is provided for independently holding each of the blades in a fixed position with respect to the friction plate as the blades move to the second position. The method further comprises the steps of (2) holding meat with the meat securing member; and (3) reciprocating the reciprocatable head from the first position to the second position to mechanically tenderize the meat.

In a still further embodiment, the reciprocating step includes releasing any blade of the set of orthogonal blades that encounters a release force exceeding the predetermined force for holding each of the blades in a fixed position.

In another embodiment, the method further comprises, the steps of returning the head and the blades to the first position; resetting any released blades using a press plate; and repeating the reciprocating step.

Further objects, features and advantages of the present invention will become apparent from the Detailed Description of Preferred Embodiments, which follows, when considered together with the attached drawings.

DETAILED DESCRIPTION OF THE INVENTION

Figure 1:
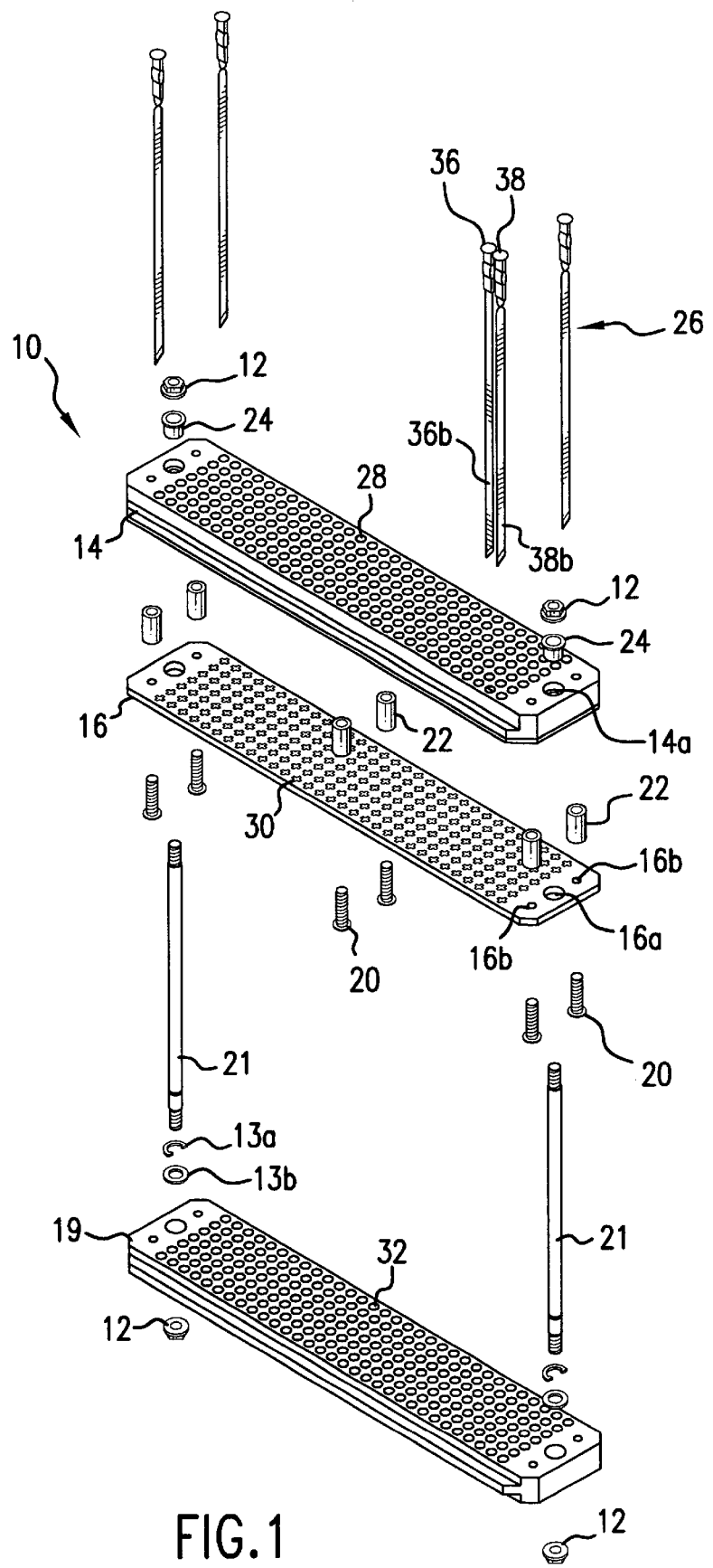
FIG. 1 is an exploded view of the improved head according to the present invention.
Figure 2:
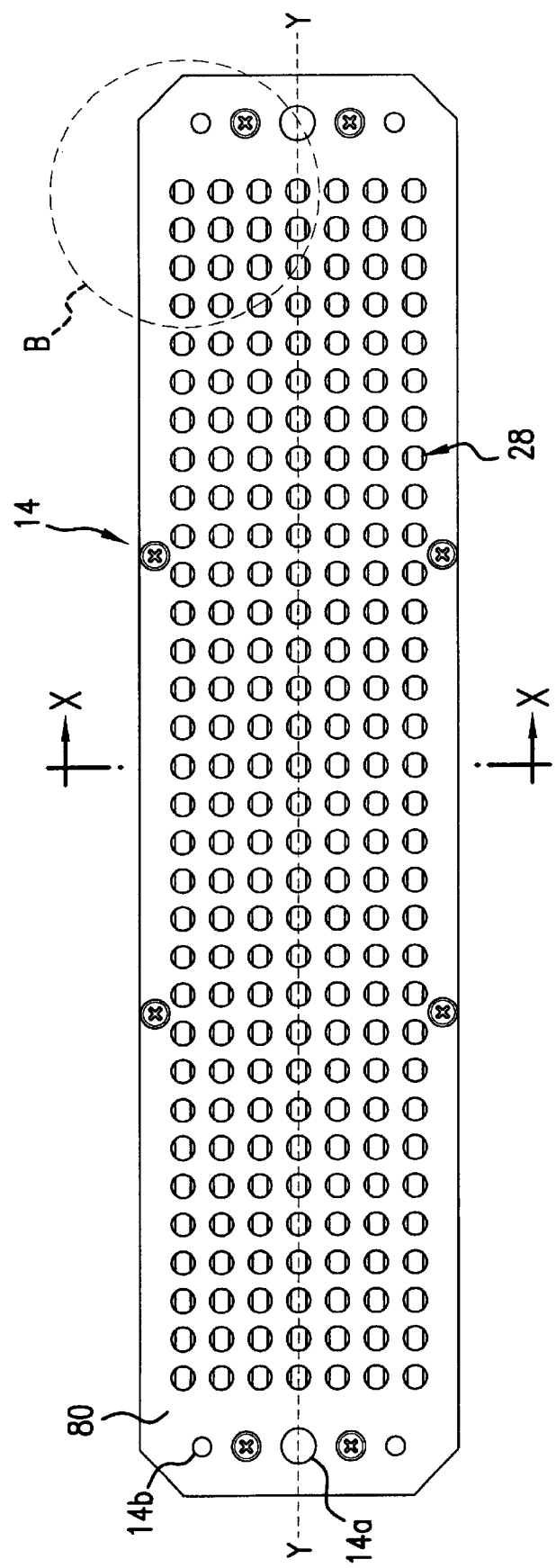
FIG. 2 is bottom view of the friction plate according to the present invention.

The apparatus of the present invention is a mechanical meat tenderizer with a force limiting apparatus and a set of orthogonal blades. The mechanical meat tenderizer includes a reciprocable head 10 having a set of mutually orthogonal blades 26 including a plurality of pairs blades including straight long blades 36 and orthogonal long blades 38 as shown in FIG. 1, an operational press plate (not shown) for resetting the blades, and a drive (not shown) for operating the head 10. FIG. 1 illustrates the improved head 10 of the meat tenderizing apparatus of the present invention. Head 10 includes a friction plate 14, an orientation plate 16, and meat securing member or hold-down plate 19. The hold-down plate 19 is a base plate for the head 10 for abutting against and holding down a piece of meat in the mechanical meat tenderizer as is well known. Two guide bars 21 have threaded ends and are attached at one end to plate 19 by means of fasteners such as the combination of threaded locknuts 12 (also may be referred to a "nuts" or "retaining nuts) and C-clips 13a and washers 13b illustrated. Plates 14 and 16 have guide holes 14a and 16a respectively formed therethrough for receiving the bars 21. Nuts 12 are also attached to the remaining threaded ends of bars 21 to retain the plates 14 and 16 on the bars 21.

Plates 14 and 16 are attached to one another to form a single unit that slides up and down the guide bars 21. Fasteners 20, such as screws or bolts that pass through attachment holes 16b and hollow spacers 22 and threadedly engage threaded or tapped holes 14b (also referred to as "threaded bosses"), are used to assemble plates 14 and 16 together to form a single slidable unit. Furthermore, slide bearings 24 are secured into guide holes 14a to facilitate sliding the single unit along bars 21.

Figure 6:
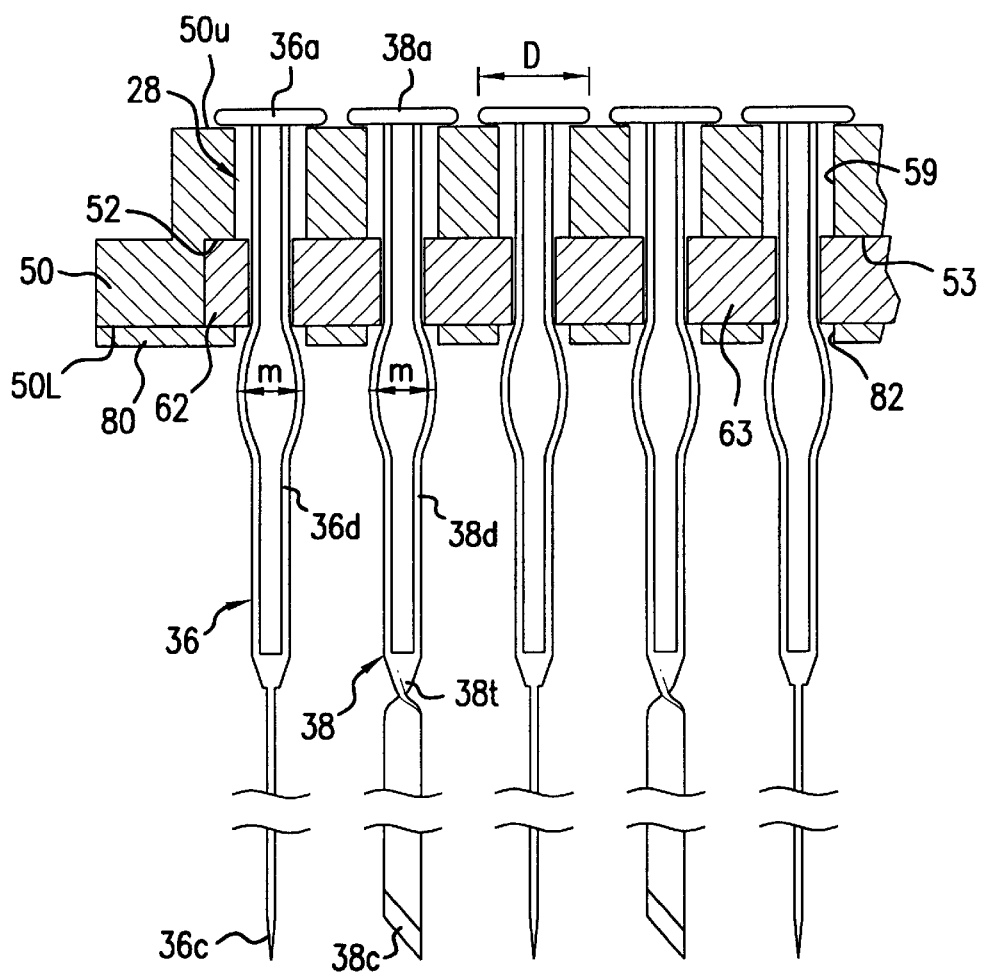
FIG. 6 is a partial cross sectional view of the friction plate of FIG. 2 taken along the X—X axis with cutting blades in place.

Friction plate 14 includes an array of blade positioning apertures 28 (or "blade holes") into which a set of orthogonal blades 26 are positioned (see also in FIG. 6). Blade positioning apertures 28 and friction plate 14 will be discussed in detail below. Friction plate 14 positions the blades to form an array for tenderizing meat and provides a force limiting apparatus permitting individual blades to be released if a predetermined force is exceeded when the blade encounters hard material in the meat such has bone, cartilage, frozen meat portions, etc.

The blade orienting member, in a this embodiment an orientation plate 16 has an array of blade orientation apertures 30, which correspond, one-to-one to the array of blade positioning apertures 28. In other words, each blade 36, 38 is positioned in a respective one of the positioning apertures 28 so that the abutment portion 36a, 38a of the blade abuts against the friction plate 14 as shown in FIG. 6; and, the tip portion 36b, 38b of the blade passes through a corresponding orientation aperture 30. As is known in the art, each orientation aperture 30 is cross-shaped, which allows adjacent blades to be oriented so that the cutting surfaces 36c, 38c (also called "cutting portions") are orthogonal ("perpendicular") to each other as shown in FIG. 6. The purpose of the orientation plate 16 is to stabilize and support the long blades 36 and 38 so that each blade maintains its proper orientation and is less likely to bend.

The meat securing member, in this embodiment a hold-down plate 19, also has an array of blade thrusting apertures 32 through which the cutting portions 36c, 38c of the blades 36, 38 are thrust during operation to tenderize the meat. The head 10 is constructed so that each positioning aperture 28 is linearly aligned with a respective orientation aperture 30 and a respective thrusting aperture 32. Consequently, any blade 36 or 38 can be placed into any one of the positioning apertures 28 and properly positioned into the corresponding linearly aligned respective orientation aperture 30 and thrusting aperture 32.

In operation, the process of tenderizing includes placing a piece of meat into the mechanical meat tenderizer and moving the head 10 into position to hold down and secure the meat. The slidable single unit (provided by plates 14 and 16) and the set of orthogonal blades 26 begin the process in first, or up, position in which the blades are retracted. Then, the drive pushes the single unit comprising plates 14 and 16 down along the guide bars 21 which forces the set of orthogonal blades 26 through the array of thrusting apertures 32 to a second extended position and into the meat. During the reciprocating step, from the first to second positions, the process includes releasing any blade that encounters some obstacle in the meat and exceeds a predetermined release force caused by the blade encountering, for example, bone, cartilage, frozen portions, or anything else hard enough to damage the blade. Next, the drive returns the single unit up the guide bars 21 so that the set of orthogonal blades 26 returns or reciprocates to the up or first position. Also, either during or after the drive returns the single unit and the set of orthogonal blades back into the first position, the press plate resets any blades that were released during the reciprocating step. This step of resetting all released blades is well known in the art. Lastly, by repeating the step of reciprocating and resetting multiple times, the meat is rapidly, mechanically tenderized.

Figure 3:
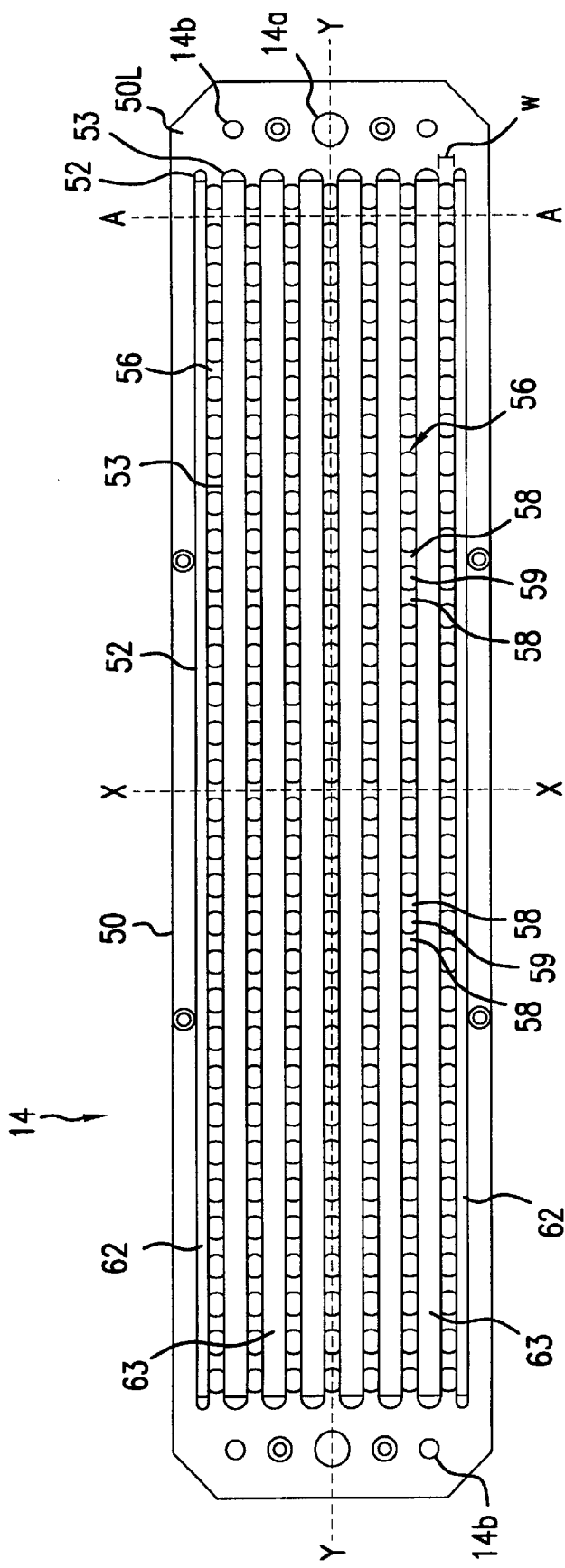
FIG. 3 is a bottom view of the friction plate according to the present invention with the face plate removed.
Figure 4:
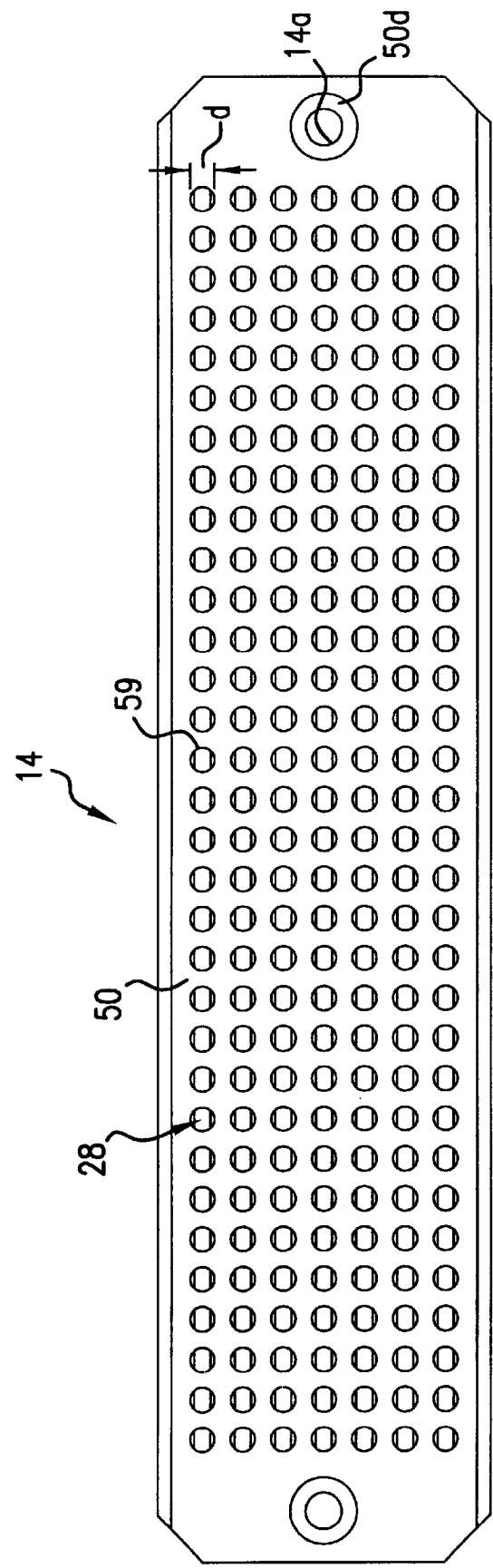
FIG. 4 is a plan view of the friction plate according to the present invention.
Figure 5:
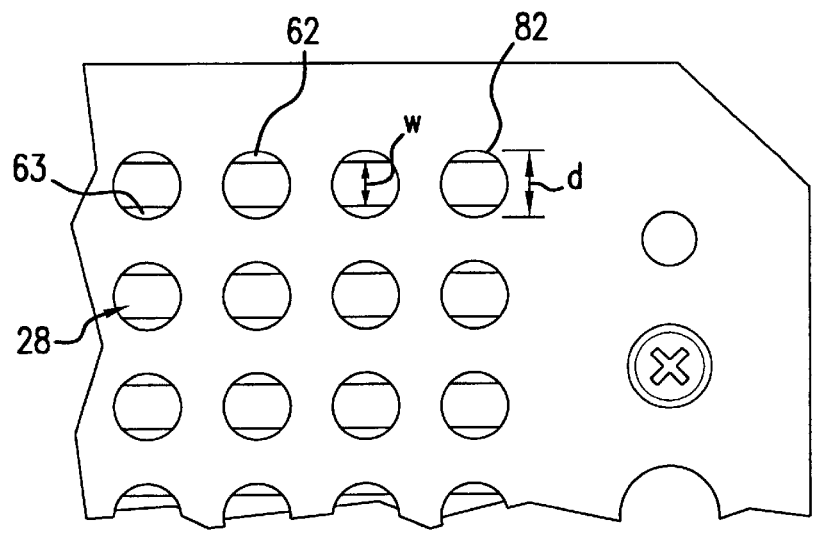
FIG. 5 is a magnified view of the area B of the friction plate shown in FIG. 2.

At this point, the structure and operation of a portion of the reciprocatable head according to the invention, the friction plate 14, will be described in detail and the relationship between the plate 14 and the blades 36 and 38 will be expounded upon. As shown in FIGS. 3 and 4, friction plate 14 includes a frame plate 50 and a plurality of friction bars 62, 63 disposed on a lower face 50L of the plate 50. The frame plate 50 includes guide holes 14a for receiving the guide bars 21 and a portion of each hole 14a is bordered by a ledge 50d that provides an abutment surface for the retaining nut 12 attached to the end of guide bars 21. Plate 50 also includes the threaded bosses 14b for attaching to the fasteners 20.

A plurality of longitudinal grooves 52, 53 oriented along the Y—Y axis are formed in plate 50. Grooves 52 are lateral grooves and are about half the width of the center grooves 53. Separating each groove 52, 53 is an interrupted longitudinal ridge 56. Each interrupted ridge 56 includes a plurality of islands 58 separated by plate apertures 59. The plate apertures 59 are formed in plate 50 by any number of methods, such as drilling. As shown in FIG. 4, apertures 59 are circular is shape and open on both the upper face 50u and the lower face 50L of plate 50 (see also FIG. 6). Each aperture 59 is centered along the midline longitudinal axis of one of the ridges 56; furthermore, the diameter d of each aperture 59 is greater than the transverse width w of each ridge 56. Subsequently, grooves 52 and 53 are formed in the plate 50 so as to intersect with a plurality of the apertures 59. In this manner, the islands 58 are formed and it is evident from FIG. 3 that two opposing walls of each island are concave and that the other two walls of each island are linear.

From FIGS. 3 and 6 it is shown that friction bars 62, 63 are positioned into the grooves 52, 53 so that the lateral friction bars 62 are fitted into the lateral grooves 52 and the center friction bars 63 are fitted into the center grooves 53. Preferably, the bars 62, 63 are press fitted respectively into grooves 52, 53 and it is evident that lateral bars 62 are about half the width of the center bars 63.

Preferably, plate 50 is made of a metal with excellent machinability characteristics, such as aluminum, although any suitable metal can be used. The bars 62 and 63 are preferably made of a harder metal, such as steel, although any suitable hard metal can be used. In a preferred embodiment of the invention, bars 62 and 63 are coated with a highly lubricious, very hard thin film used for reducing friction. One example of a suitable material for forming the thin film is CASIDIAM™, a film material composed of carbon, hydrogen and doping elements. The desired properties of CASIDIAM™ are disclosed in detail in U.S. Pat. No. 5,826,628 to Hamilton, the entire disclosure of which is incorporated herein by reference. By making the friction bars 62, 63 out of a hard metal coated with a lubricious material, the positioning apertures 28 can be made to have a fairly uniform frictional effect on each individual blade 36 or 38. In practice, it has been found that the walls of the positioning apertures 28 of the present invention can be made to exert a predetermined frictional force on each blade of substantially 4 pounds on average, with a variance of plus or minus one ounce, before the blade is released from the aperture. Therefore, if any blade experiences more than 4 pounds of force when cutting through meat, then that blade should be released from its aperture 28 and pop up. This result is much superior to the square aperture of the prior art (Ter-Minassian) device which can only be made to exert a predetermined frictional force on each blade of 4 pounds on average, with a variance of plus or minus 2 pounds. Consequently, fewer blades are damaged when apertures 28 are used, than when the prior square apertures are used.

Another way to describe this feature of the present invention is that the present invention achieves a predetermined release force of substantially 4 pounds on average because, by definition in this context, the variance among each aperture 28 of the array of apertures 28 is only plus or minus one ounce. The prior device of Ter-Minassian achieves a predetermined release force of not substantially 4 pounds on average because of the variance among each square aperture of the array of square apertures is greater than plus or minus one ounce.

In a preferred embodiment, friction plate 14 includes faceplate 80 attached to the lower face 50L as shown in FIG. 6. Screws, other fasteners, or any other equivalent means can be used to secure the faceplate 80 to the plate 50. Faceplate 80 is preferably made of stainless steel to facilitate friction bar 14 cleaning and retains the press fitted friction bars 62 and 63 in their respective grooves 52 and 53. Faceplate 80 includes an array of face apertures 82 corresponding to the plate apertures 59 and having the same diameter d as the plate apertures 59. In this manner, the wall of a plate aperture 59 and the wall of a face aperture 82 make up portions of the wall of positioning aperture 28. The remaining portion of the wall of positioning aperture 28 is formed by adjacent friction bars as shown in FIG. 6. In other words, each positioning aperture 28 is a contiguous hole through friction plate 14 and comprises a plate aperture 59 properly aligned with a corresponding face aperture 82. The narrowest portion of each positioning aperture 28 occurs where the friction bars encroach. In this narrowest portion, the transverse width of each positioning aperture 28 is equal to w, the transverse width of the interrupted ridge 56. The longitudinal dimension of each positioning aperture 28 in the narrowest portion is still equal to d, the diameter of the positioning aperture 28 outside of the narrowest portion. Therefore, it should be appreciated that the positioning aperture 28 is substantially a cylindrical hole outside of the narrowest portion and has a non-cylindrical hole geometry in the region of the narrowest portion.

Having described the structure and geometry of the positioning apertures 28 of the present invention, structure and geometry of the blades 36 and 38 will be described as well as the frictional interaction between each blade and the walls of the positioning apertures 28. It is noted that in the preferred embodiment of the invention, the friction plate 14 includes a face plate 80 so that a portion of each positioning aperture 28 includes a respective face aperture 82; however, without departing from the spirit and essential function of the invention, the invention can be practiced without the face plate 80.

As is best appreciated from FIGS. 1 and 6, the set of orthogonal blades 26 is made up of a plurality of blade pairs 36, 38. Each pair includes a straight blade 36 and an orthogonal, or twisted, blade 38. Each blade 36, 38 is made of metal and has a respective abutment portion 36a, 38a, a friction spring or friction member 36d, 38d, a tip portion 36b, 38b, and a cutting portion 36c, 38c. The portions of each blade are integrally formed so that each blade is a unitary piece.

Each abutment portion has a diameter D that is greater than the diameter d of the positioning apertures 28 so that the abutment portion will rest upon the upper face 50u of the plate 50. Each spring is formed by two leaf portions and has a taper at each end and a maximum width m. It is essential that the maximum width m be greater than the transverse width w of the narrowest portion of each positioning aperture 28. Preferably, the maximum width m is less than the diameter d of the other portions of the positioning aperture 28 so that only the walls of the narrowest portion will exert a frictional force upon a respective spring 36d or 38d. As shown in FIG. 6, each blade 36, 38 is positioned into a positioning aperture 28 with the leaf portions arranged transversely in the aperture 28 so that each leaf portion abuts and frictionally engages a respective one of the friction bars 62, 63. Because width m is greater than width w, the leaf portions necessarily are compressed towards one another during the process of placing each blade properly in a respective aperture 28. The compression force provided by the leaf portions of each spring results in a frictional force exerted by the friction bars on each blade as it passes through the narrowest portion of each positioning aperture. Therefore, each blade 36, 38 must be pressed into position in a respective positioning aperture 28.

It should be appreciated that an equal amount of force is required to push a blade out of its respective positioning aperture as was required to press the blade into position. When a cutting portion 36c, 38c encounters bone, tendons, frozen meat portions, etc . . . during a down thrust of the single slidable unit during operation of the mechanical meat tenderizer, the meat may exert an upwards force on the blade 36, 38. When this upwards force ("release force") exceeds the force required to press the blade into its positioning aperture, then the meat pushes the blade 36, 38 out of the aperture 28. By careful manufacture of the positioning apertures 28, any desired substantial predetermined release force is theoretically attainable. In this context, the substantial predetermined release force is defined as the minimum force generated between the friction bars and the springs that would effect a release of a blade from its respective positioning aperture. In practice, a substantial predetermined release force of 4 pounds on average is most desirable. When the release force generated by the meat exceeds the substantial predetermined release force, then the blade is released and pops out of the positioning aperture.

Another important feature regarding each blade is that the springs 36d, 38d are made so that when each blade 36, 38 is properly positioned in a respective aperture 28, the abutment portion 36a, 38a rests on the upper surface 50u of plate 50 and the maximum width m is disposed below the friction bars 62, 63 as shown in FIG. 6. This relationship between the maximum width and the friction bars results in no significant frictional force exerted by the bars on the blades when the blades have been pressed into place. In addition, during the placement of the blades into place, it should be appreciated that as the maximum width clears the friction bars the springs decompress. The tapered geometry of the springs and the inherent tendency of the springs to push back into the uncompressed state actually helps pull each blade into the positioning aperture once the maximum width has cleared the friction bars. Consequently, when the mechanical meat tenderizer has to reset all released blades during operation, the press plate need generate an impulse only sufficient to clear the maximum width of each released blade from the friction bars. The result is that the hydraulically operated press plate can perform its function by utilizing smaller impulses (force exerted for a period of time) and the meat tenderizer operates more quietly.

Lastly, it is noted that the main difference between the straight blades 36 and the orthogonal blades 38 is that the straight blade is straight so that the cutting portion 36c is oriented along the longitudinal axis direction (Y axis) of the friction plate 14. The orthogonal blade 38 has a twist 38t so that the cutting portion 38c is oriented along the direction transverse (A axis) to the longitudinal direction (Y axis) of the friction plate 14. The results of this blade pair geometry is that each blade 36, 38 is oriented in the friction plate 14 so that the spring leaf portions may frictionally engage the friction bars, but the cutting portions 36c, 38c are oriented orthogonal to one another so that orthogonal cuts are made in the meat.

While the present invention has been described with reference to certain preferred embodiments, one of ordinary skill in the art will recognize that additions, deletions, substitutions, modifications and improvements can be made while remaining within the spirit and scope of the present invention as defined by the appended claims.

What is claimed is:

1. An apparatus for mechanically tenderizing meat comprising:
   (1) a plurality of elongated cutting blades having cutting edges formed on one end thereof, a frictional member proximate another end thereof, and a longitudinal axis; and
   (2) a reciprocatable head holding the plurality of cutting blades and movable from a first position wherein the plurality of blades is retracted to a second position wherein the plurality of blades is extended, the reciprocatable head comprising
      (a) a meat securing member,
      (b) a friction plate, and
      (c) a blade orienting member disposed to orient the blades in spaced relationship so that the longitudinal axis of each blade is aligned substantially parallel to the longitudinal axis of each other blade,
         wherein the friction plate comprises a plurality of friction bars disposed to frictionally engage the friction members of the blades, wherein each bar of the plurality of bars frictionally engages the frictional member of each blade of a respective set of the blades so that a predetermined force is provided for independently holding each of the blades in a fixed position with respect to the friction plate as the blades move to the second position.

2. An apparatus according to claim 1, wherein the friction member is a spring.

3. An apparatus according to claim 1, wherein the friction member is a spring formed by two, leaf portions having a taper at each end and a maximum width portion.

4. An apparatus according to claim 1, wherein the friction bars are coated with a lubricious material.

5. An apparatus according to claim 4, wherein the lubricious material comprises carbon, hydrogen and doping elements, the material having a mixture of tetrahedral diamond bonds and trigonal graphitic bonds.

6. An apparatus according to claim 4, wherein the lubricious material is CASIDIAM.

7. An apparatus according to claim 1, wherein the friction plate releases any blade of the plurality of blades that encounters a release force exceeding the predetermined force.

8. An apparatus according to claim 7, wherein the blade orienting member is a plate having a plurality of cross-shaped holes corresponding to a plurality of the cutting blades.

9. An apparatus according to claim 1, wherein the friction plate further comprises a face plate.

10. An apparatus according to claim 9, wherein the friction plate includes an array of positioning apertures wherein each blade of the plurality of cutting blades is positioned in a corresponding one of the positioning apertures and a portion of a respective wall defining each aperture is formed by a portion of a respective friction bar.

11. An apparatus according to claim 10, wherein the portion of the respective friction bar forms a narrowing in the respective aperture.

12. An apparatus according to claim 1, wherein the plurality of elongated cutting blades includes at least one straight blade and at least one twisted blade.

13. A method for tenderizing meat comprising the steps of
   (1) providing an apparatus comprising:
      (a) a plurality of elongated cutting blades having cutting edges formed on one end thereof, a frictional member proximate another end thereof, and a longitudinal axis; and
      (b) a reciprocatable head holding the plurality of cutting blades and movable from a first position wherein the plurality of blades is retracted to a second position wherein the plurality of blades is extended, the reciprocatable head comprising
         (i) a meat securing member,
         (ii) a friction plate, and
         (iii) a blade orienting member disposed to orient the blades in spaced relationship so that the longitudinal axis of each blade is aligned substantially parallel to the longitudinal axis of each other blade,
            wherein the friction plate comprises a plurality of friction bars disposed to frictionally engage the friction members of the blades, wherein each bar of the plurality of bars frictionally engages the frictional member of each blade of a respective set of the blades so that a predetermined force is provided for independently holding each of the blades in a fixed position with respect to the friction plate as the blades move to the second position;
   (2) holding meat with the meat securing member; and
   (3) reciprocating the reciprocatable head from the first position to the second position to mechanically tenderize the meat.

14. A method for mechanically tenderizing meat according to claim 13, wherein the reciprocating step includes releasing any blade of the set of orthogonal blades that encounters a release force exceeding the predetermined force for holding each of the blades in a fixed position.

15. A method for mechanically tenderizing meat according to claim 13, further comprising the steps of:
   returning the head and the blades to the first position;
   resetting any released blades using a press plate; and
   repeating the reciprocating step.

16. A method for mechanically tenderizing meat according to claim 15, wherein, in the resetting step, the friction member of a released blade provides a resetting force to reset the released blade.

17. An apparatus according to claim 3, wherein the maximum width portion of each blade is positioned beneath the plurality of friction bars when in the fixed position.

18. An apparatus according to claim 17, wherein the spring provides the predetermined force for holding the blade in the fixed position and provides a resetting force for pulling the blade into the fixed position.

* * * * *